United States Patent [19]

Friedmann

[11] Patent Number: 4,964,504
[45] Date of Patent: Oct. 23, 1990

[54] MULTIPLE CLUTCH ASSEMBLY

[75] Inventor: Oswald Friedmann, Lichtenau, Fed. Rep. of Germany

[73] Assignee: Luk Lamellen und Kupplungsbau GmbH, Bühl, Fed. Rep. of Germany

[21] Appl. No.: 286,378

[22] Filed: Dec. 16, 1988

[30] Foreign Application Priority Data

Dec. 19, 1987 [DE] Fed. Rep. of Germany ....... 3743227

[51] Int. Cl.⁵ ..................... F16D 21/06; F16D 25/10; F16D 13/72
[52] U.S. Cl. .................................. 192/48.4; 192/48.8; 192/70.12; 192/87.11; 192/89 B; 192/91 A
[58] Field of Search ..................... 192/48.1, 48.3, 48.4, 192/48.8, 70.12, 70.27, 85 AA, 87.1, 87.11, 87.14, 87.15, 87.16, 89 B, 91 A

[56] References Cited

U.S. PATENT DOCUMENTS

| | | | |
|---|---|---|---|
| 3,279,573 | 10/1966 | Hensel | 192/87.11 |
| 3,710,650 | 1/1973 | Piret | 192/87.11 X |
| 3,970,176 | 7/1976 | Bucksch | 192/87.11 |
| 4,440,281 | 4/1984 | Hauguth | 192/48.8 |
| 4,573,560 | 3/1986 | Eguchi | 192/87.1 |

Primary Examiner—Richard Lorence
Attorney, Agent, or Firm—Peter K. Kontler

[57] ABSTRACT

A multiple clutch assembly for use in an automated transmission has two coaxial clutches wherein the discs of the driving units can be moved axially relative to the discs of the driven units by prestressed one-armed or two-armed levers in the form of diaphragam springs. The levers can be tilted with reference to the rotary housing of the multiple clutch assembly by the pistons of hydraulic cylinder and piston units. One of the cylinder and piston units is at least partially confined in the other cylinder and piston unit. One of the clutches is a starter clutch, and both clutches are actuated during changes of gear ratio for power shifting. One of the levers can be installed so that it tends to engage the respective clutch, or both levers can be installed in such a way that they tend to disengage the respective clutches.

71 Claims, 6 Drawing Sheets

MULTIPLE CLUTCH ASSEMBLY

BACKGROUND OF THE INVENTION

The invention relates to clutches in general, and more particularly to improvements in multiple clutch assemblies which can be used with advantage in automated transmissions. Still more particularly, the invention relates to improvements in multiple clutch assemblies of the type wherein one of the clutches can constitute a starter clutch and plural clutches can be operated simultaneously during a change of gear ratio for power shifting.

It is already known to combine two clutches into an assembly wherein diaphragm springs are used to constitute levers and fluid-operated motors are employed to pivot the levers. The levers can be installed in prestressed condition to urge the respective clutches to disengaged positions while the motors serve to engage the clutches, or vice versa. A drawback of presently known multiple clutch assemblies of the just outlined character is that they are bulky, complex and expensive.

OBJECTS OF THE INVENTION

An object of the invention is to provide a multiple clutch assembly which is more compact and simpler than, but at least as versatile as, heretofore known multiple clutch assemblies.

Another object of the invention is to provide a multiple clutch assembly wherein the clutches can be centrally operated and wherein the means for supplying pressurized fluid to the motors of individual clutches are simpler and more reliable than in conventional multiple clutch assemblies.

A further object of the invention is to provide novel and improved means for maintaining the temperature of sensitive parts of individual clutches within an optimum range.

An additional object of the invention is to provide a multiple clutch assembly which can be assembled or taken apart with little loss in time.

Still another object of the invention is to provide a multiple clutch assembly which can be readily installed in or otherwise combined with the casing of a transmission whose input element or elements receive torque by way of one or more clutches.

An additional object of the invention is to provide a multiple clutch assembly wherein the transmission of torque by way of its clutches can be regulated and changed in a simple and efficient manner.

Another object of the invention is to provide novel and improved means for supplying pressurized fluid to the motors of individual clutches.

A further object of the invention is to provide novel and improved clutches for use in the above outlined assembly.

An additional object of the invention is to provide novel and improved operating means for the driving and driven means of individual clutches in the above outlined assembly.

Another object of the invention is to provide a novel and improved method of installing the multiple clutch assembly between an engine or another prime mover and a variable speed transmission.

A further object of the invention is to provide a novel and improved power train which embodies the above outlined multiple clutch assembly.

Another object of the invention is to provide novel and improved operative connections between the resilient levers and fluid-operated motors in the clutches of the above outlined assembly.

An additional object of the invention is to provide a relatively inexpensive and rugged multiple clutch assembly which can be used as a superior substitute for heretofore known multiple clutch assemblies.

SUMMARY OF THE INVENTION

The invention is embodied in a multiple clutch assembly which can be used with particular advantage in conjunction with automated transmissions and wherein one clutch is operative to start the transmission of torque and plural clutches are operative during a change of gear ratio for power shifting. The improved clutch assembly comprises first and second clutches each of which has rotary driving and driven means (such as clutch discs and pressure plates) and operating means actuatable to selectively couple the driving means with and disconnect the driving means from the respective driven means. Each of the operating means comprises a lever including or constituting at least one prestressed diaphragm spring, and a cylinder and piston unit for moving the respective lever between a first position in which the respective driving and driven means are coupled to each other and a second position in which the respective driving and driven means are disconnected from each other. In accordance with a feature of the invention, one of the cylinder and piston units is at least partially confined (e.g., telescoped into) in the other unit.

If the two cylinder and piston units are coaxial, the one unit can be axially telescoped into the other unit.

One of the levers can constitute a one-armed lever or a two-armed lever. Alternatively, each lever can constitute a two-armed lever. Furthermore, one of the diaphragm springs can be prestressed in a sense to ensure that the respective lever tends to assume the first position. Alternatively, each diaphragm spring can be prestressed in a sense to ensure that the respective lever tends to assume the second position.

The cylinder and piston units are preferably installed in the housing of the multiple clutch assembly radially inwardly of the driving and driven means, and the one unit is then disposed radially inwardly of the other unit. The two units can comprise a common cylinder which is rigid with the housing; the pistons of such units are coaxial and are reciprocable relative to the common cylinder. The arrangement may be such that one of the pistons is disposed in and the other piston surrounds the common cylinder.

The driving and driven means of each clutch can comprise an axially movable member (such as a pressure plate) and the cylinder and piston unit of each such clutch can comprise an axially movable piston. Each lever of such multiple clutch assembly can comprise a first portion which is engageable by the respective piston, a second portion which is disposed radially outwardly of the first portion and is tiltably mounted in the housing, and a third portion which is disposed radially outwardly of the first portion and is engageable with the respective axially movable member.

The housing can include a tubular section and a substantially washer-like partition which extends substantially radially inwardly from the tubular section between the ends of the latter. The levers of both clutches and the driving and driven means of the first clutch can be disposed at one side of the partition, and the driving and driven means of the second clutch can be disposed at the other side of the partition. The lever of the first clutch in such cylinder and piston assembly can comprise a first portion which is engageable with the respective piston, a second portion which is disposed radially outwardly of the first portion and is engageable with the respective axially movable member, and a third portion which is disposed radially outwardly of the second portion and is tiltably mounted in the housing. Alternatively, the lever of the first clutch can include a first portion which is engageable with the respective piston, a second portion which is disposed radially outwardly of the first portion and is tiltably mounted in the housing, and a third portion which is disposed radially outwardly of the second portion and is engageable with the respective axially movable member.

The lever of the second clutch at the other side of the partition can include a first portion which is engageable with the piston of the respective cylinder and piston unit, a second portion which is located radially outwardly of the first portion and is tiltably mounted in the housing, and a third portion which is located radially outwardly of the second portion and is movable relative to the housing in response to tilting of the second portion. The second clutch further comprises means for pulling the respective axially movable member toward the partition in response to tilting of the second portion of the respective lever. The pulling means is preferably disposed radially outwardly of the driven means of the clutches.

The housing can further comprise an intermediate member which is adjacent one end of the tubular section of the housing and is disposed between the levers of the two operating means. Such intermediate member can include axially extending projections which pass through slots between the prongs of the lever in the second clutch. The housing of the multiple clutch assembly can further comprise a carrier having a substantially flange-like member which is connected with the projections of the intermediate member. The lever of operating means in the first clutch is disposed between the flange-like member of the carrier and the intermediate member of the housing. The flange-like member can be rigid or integral with a protuberance (e.g., in the form of an axially extending stub) which is rotatably mounted in a suitable casing, e.g., in a transmission case. To this end, the casing can be provided with an axial bore for the stub of the carrier, such stub preferably extending in a direction away from the tubular section and intermediate member of the housing.

The lever of operating means in the second clutch is preferably located between the intermediate member of the housing and the lever of operating means in the first clutch. The piston of the cylinder and piston unit in the first clutch preferably surrounds the piston of the cylinder and piston unit in the second clutch.

The piston of the one unit can be provided with an extension which projects axially through and beyond the piston of the other unit, preferably into an internal space of the housing. Such assembly further comprises a cupped actuator or other suitable means for transmitting motion between the extension of the piston in the one unit and the lever of the respective clutch. The actuator is preferably installed in the internal space of the housing and engages the lever of the clutch having driving and driven means disposed axially between the partition and intermediate member of the housing.

The improved multiple clutch assembly further comprises a suitable source of pressurized fluid (e.g., oil), and means for conveying pressurized fluid from such source to the cylinder and piston units. Still further, the improved assembly preferably comprises a source of a suitable coolant (e.g., oil) and means for conveying coolant from the respective source to the clutches. The fluid conveying means can include at least one first channel which is provided in the aforementioned carrier and serves to supply pressurized fluid to at least one of the cylinder and piston units, and at least one second channel provided in a cylinder which is common to the two units and is rigid with the housing of the multiple clutch assembly. The second channel delivers pressurized fluid to a working chamber of one of the cylinder and piston units (such working chamber is defined by the respective piston and the aforementioned common cylinder). In accordance with a presently preferred embodiment, the means for conveying pressurized fluid is common to the two cylinder and piston units. This simplifies the operation of the cylinder and piston units if their working chambers are to receive fluid at the same pressure. The operating means of the two clutches then include (or can comprise) means for communicatively connecting the working chambers of the two units to each other, e.g., by a portion of the means for conveying pressurized fluid from the respective source to the working chambers.

The improved multiple clutch assembly can further comprise means for opposing movements of at least one of the pistons in a predetermined direction, e.g., for opposing movements of the at least one piston in a direction to engage the respective clutch by urging the corresponding driving means into torque-transmitting engagement with the associated drive means. In other words, such opposing means can resist movements of the at least one piston in a direction to disengage the respective clutch by acting upon the lever which tends to maintain such clutch in engaged condition. The opposing means can include a compartment and means for admitting into the compartment a pressurized medium (preferably the fluid which is admitted into the working chambers of the cylinder and piston units) which opposes the movement of one of the pistons in response to admission of pressurized fluid into the respective working chamber. The compartment is preferably provided in one of the cylinder and piston units. The piston of the unit embodying the compartment is preferably disposed between such compartment and the respective working chamber. It is preferred to provide the compartment between the aforementioned common cylinder and that piston which is reciprocable within the cylinder. The pressure of the medium in the compartment can be maintained at up to 60% (particularly at 5-40%) of fluid pressure in the respective working chamber.

The means for conveying coolant from the source of coolant to the two clutches can include substantially axially extending conduits (e.g., in the form of straight pipes) which are mounted in the aforementioned carrier of the housing. Oil is a satisfactory coolant. The conduits preferably include at least one relatively short conduit for delivery of coolant to one of the clutches, and at least one longer conduit for delivery of coolant to the other clutch. The conduits are preferably located radially outwardly of the cylinder and piston units and can extend through the slots of diaphragm springs which constitute or form part of the levers.

The multiple clutch assembly can further comprise means for regulating the flow of coolant to at least one of the clutches, particularly to the clutch wherein the piston of the cylinder and piston unit is disposed within the common cylinder. The flow regulating means can include a substantially plate-like valve which is, or which can be, mounted on the aforementioned actuator in the internal space of the housing. The purpose of the valve is to at least reduce the flow of coolant to the driving and/or driven means of the at least one clutch when the latter is disengaged, i.e., when the cooling action is not necessary. This can be readily achieved by mounting the valve on the actuator in such a way that the valve at least throttles (or totally interrupts) the flow of coolant to the respective clutch in response to movement of the actuator in a predetermined direction, namely in a direction to effect a disengagement of the respective clutch (second position of the corresponding lever).

The inlets of conduits forming part of the cooling means can receive coolant from an annular channel which is machined into or is otherwise formed on or in the flange of the carrier and receives coolant from the respective source. The arrangement is or can be such that the inner side of the annular channel is open and the source (such as the aforementioned casing) has one or more ports or otherwise configured outlets which admit coolant into the annular channel by way of the open inner side. The thus admitted coolant is circulated by the rotating carrier (which receives torque from an engine and rotates the tubular section and other parts of the housing) and is compelled to enter the conduits under the action of centrifugal force. The casing can receive coolant from the pump, i.e., the casing and the pump can constitute a composite source of pressurized fluid for the cylinder and piston units and of coolant for the clutches. The pump is driven by the engine, e.g., by way of a gear on the aforementioned projection or stub of the carrier. The pump has first outlet means for admission of pressurized fluid to the fluid conveying means (which delivers pressurized fluid to the cylinder and piston units) and the casing has the aforementioned (second) outlet or outlets for admission of coolant into the annular channel of the carrier. The provision of combined cooling means for the clutches and means for conveying pressurized fluid to the cylinder and piston units contributes to simplicity, compactness and lower cost of the multiple clutch assembly.

The housing can be said to constitute a means for rotating the driving means of the two clutches (the carrier of the housing can receive torque from the engine), and the power train including the improved multiple clutch assembly can further comprise torsional vibration damping means which is interposed between the engine and the stub of the carrier. Such vibration damping means can include at least one flywheel which is driven by the engine (e.g., by the crankshaft of an internal combustion engine in a motor vehicle), at least one torque limiting slip clutch which is interposed between the flywheel or flywheels and the stub of the carrier, and at least one elastic damper between the slip clutch and the stub.

The driving and driven means of each clutch can comprise clutch discs and holders for the clutch discs of the driven means. In order to save space, one of these holders can extend into the other holder. Each holder can transmit torque to an input element of a transmission or the like in response to engagement of the respective clutch. The holders can be cupped axially of the clutches in a direction away from the carrier of the housing. One of the holders can be provided with one or more openings for admission of coolant to the clutch discs of the clutch embodying the other holder. The one holder can be provided with a plurality of openings having identical or different sizes and/or shapes if this contributes to more uniform distribution of coolant upon the discs of the clutch embodying the other holder.

The holder of at least one of the clutches can be provided with an apertured trough or other suitable means for distributing the coolant upon the respective clutch discs, and such distributing means can be disposed radially inwardly of the clutch discs.

Furthermore, at least one of the holders can be provided with means (e.g., a split ring) for limiting axial movements of clutch discs forming part of the respective driven means. The movements of the other holder in the axial direction of the clutches can be limited by installing this other holder between the one holder and a radially inwardly extending flange of the housing so that the axial play of the other holder does not suffice to permit its separation from clutch discs forming part of driven means in the respective clutch.

One of the clutches constitutes a starter clutch, and the number of clutch discs in one of the clutches (e.g., in the starter clutch) can exceed the number of clutch discs in the other clutch.

The novel features which are considered as characteristic of the invention are set forth in particular in the appended claims. The improved multiple clutch assembly itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 4 is a function diagram of the multiple clutch assembly of FIGS. 3 and 3a.

DESCRIPTION OF PREFERRED EMBODIMENTS

Figure 1:
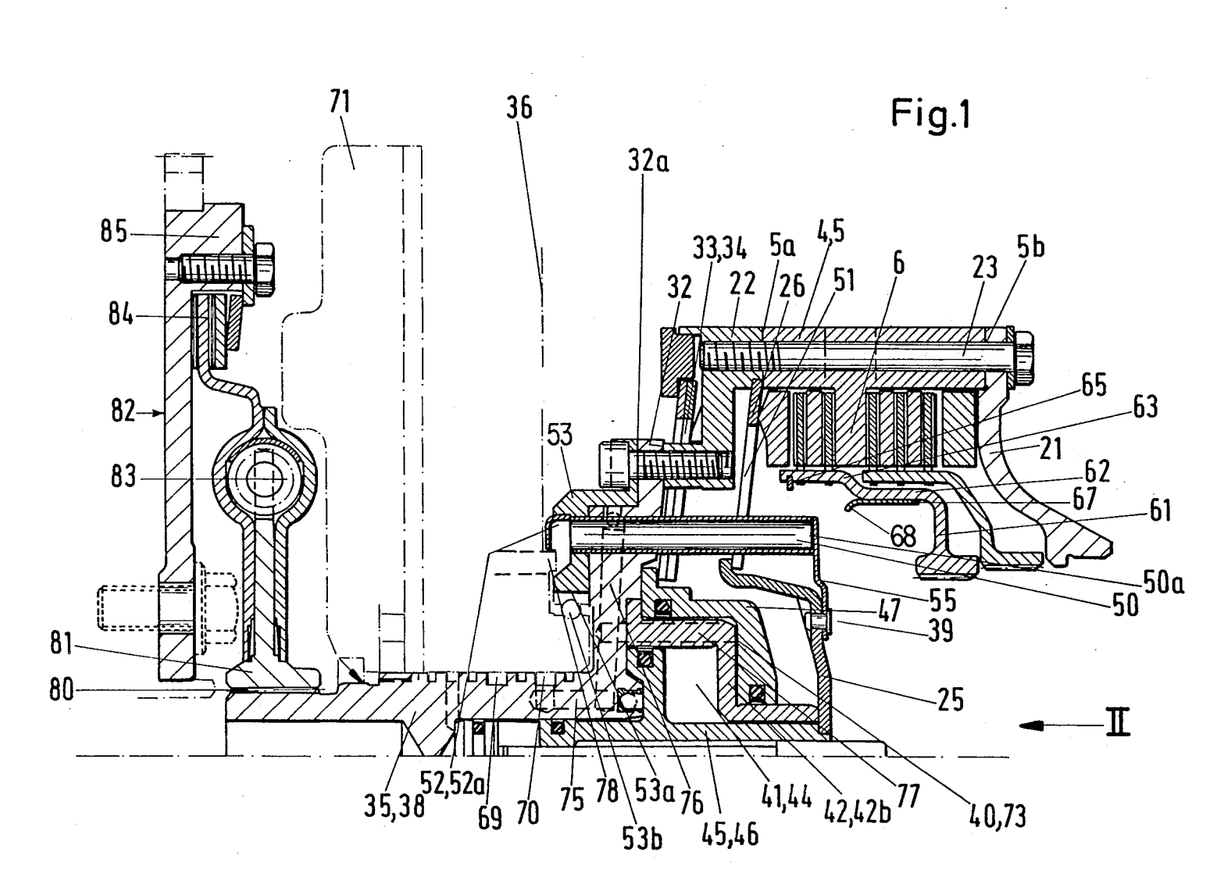
FIG. 1 is an axial sectional view of one-half of a multiple clutch assembly embodying one form of the invention.
Figure 1A:
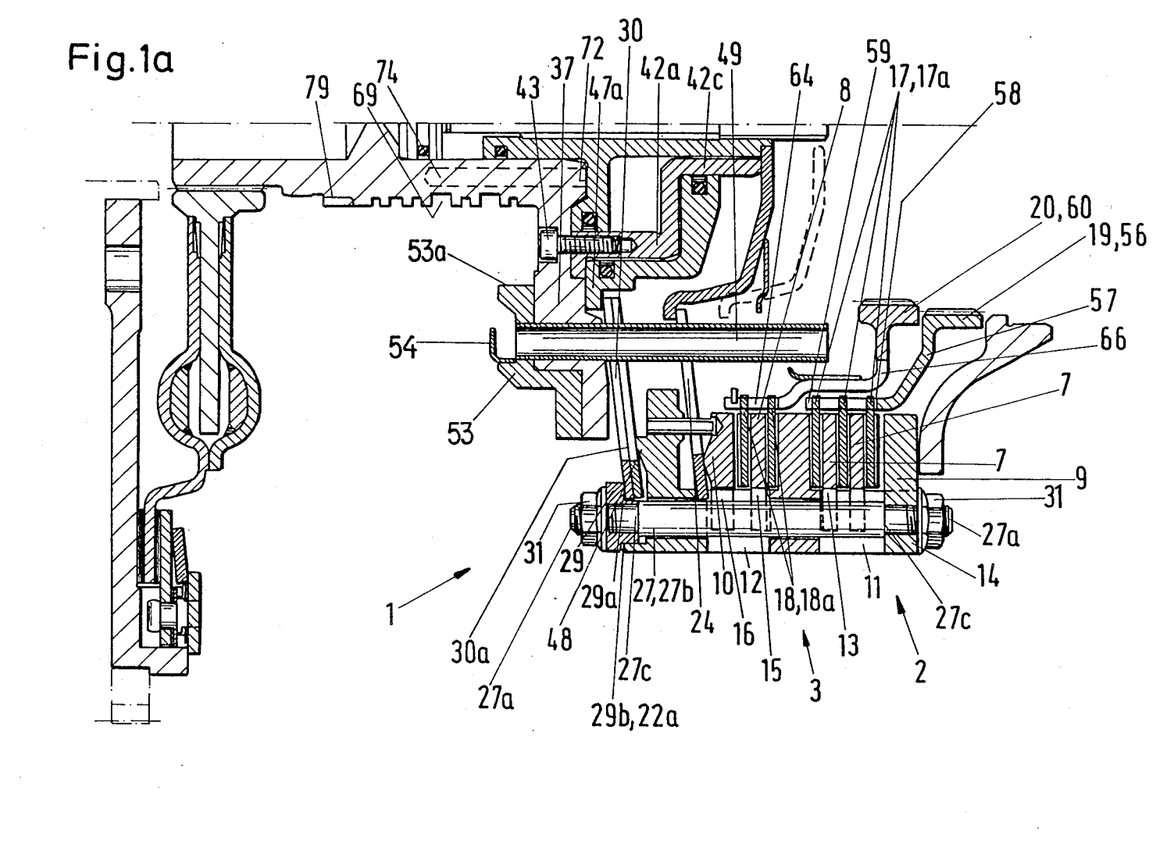
FIG. 1a is a similar axial sectional view of the other half of the multiple clutch assembly.
Figure 2:
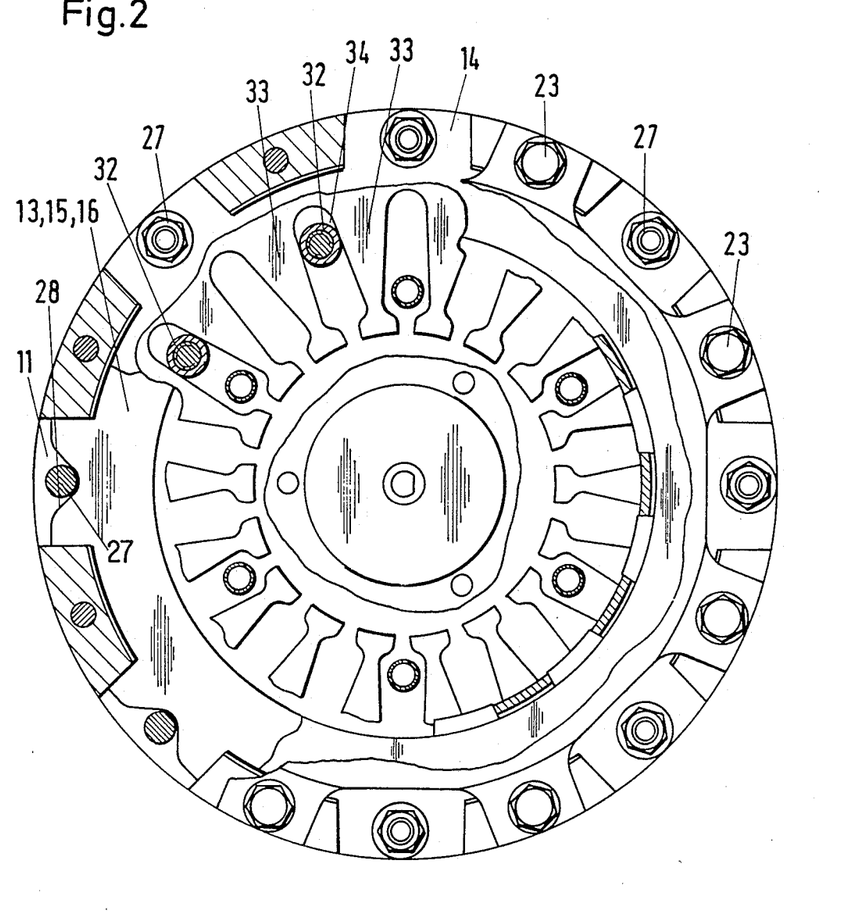
FIG. 2 is a smaller-scale end elevational view as seen in the direction of arrow II in FIG. 1, with certain parts broken away.

Referring first to FIGS. 1, 1a and 2, there is shown a multiple clutch assembly 1 which can be installed between an internal combustion engine (located to the left of FIGS. 1 and 1a) and a variable speed transmission having a casing or case indicated in FIG. 1 by a phantom line 36. The clutch assembly 1 comprises a housing 4 for two clutches 2 and 3. The housing 4 comprises a tubular section 5 one end (5a) of which is adjacent a radially inwardly extending intermediate member 22 and the other end (5b) of which is adjacent a radially inwardly extending flange 21. The median portion of the tubular section 5 is integral with a radially inwardly extending washer-like wall or partition 6 which is disposed between the intermediate member 22 and the flange 21 of the housing 4 and is also disposed between the driving and driven means of the clutch 2 on the one hand and the driving and driven means of the clutch 3 on the other hand. The operating means of the clutch 2 (namely the means for moving the driving means of the clutch 2 into and from torque transmitting engagement with the driven means of the clutch 2) comprises a lever 30 which is composed of two immediately adjacent diaphragm springs, and a hydraulic cylinder and piston unit 40 which serves to tilt the lever 30 relative to the housing 4. The operating means of the clutch 3 comprises a lever 24 which includes a single diaphragm spring, and a hydraulic cylinder and piston unit 41 which can tilt the lever 24 relative to the housing 4. The lever 24 is a one-armed lever, and the lever 30 is a two-armed lever.

The driving means of the clutch 2 comprises the partition 6, an axially movable annular pressure plate 9 which is adjacent the flange 21 of the housing 4 and is disposed between this flange and the partition 6, and two clutch discs or laminations 7 between the pressure plate 9 and partition 6. The driven means of the clutch 2 comprises three clutch discs 17 which alternate with the parts 6, 7, 9 of the driving means. The clutch discs 7, 17 and the pressure plate 9 are movable axially of the two clutches and tubular housing section 5 relative to each other and relative to the partition 6. The tubular section 5 has at least one window 11 (see also FIG. 2) for radially outwardly projecting extensions 13 of clutch discs 7 and for the radially outwardly projecting extension 14 of the axially movable pressure plate 9. The extensions 13, 14 ensure that the clutch discs 7 and the pressure plate 9 cannot rotate relative to the housing 4 and vice versa. On the other hand, the extensions 13, 14 enable the clutch discs 7 and the pressure plate 9 to move axially between the partition 6 and the flange 21.

The driving means of the clutch 3 comprises an axially movable pressure plate 10 which is disposed between the intermediate member 22 and the partition 6 of the housing 4, and a single clutch disc 8 between the pressure plate 10 and partition 6. The driven means of the clutch 3 comprises two clutch discs 18 which alternate with the pressure plate 10, clutch disc 8 and partition 6. The tubular section 5 of the housing 4 has at least one second window 12 for the radially outwardly projecting extension 15 of the clutch disc 8 and for the radially outwardly projecting extension 16 of the pressure plate 10. The window or windows 11 at one side of the partition 6 can but need not be aligned with the window or windows 12 at the other side of the partition.

The clutch discs 17 of driven means of the clutch 2 are mounted on and extend radially outwardly from a first cupped holder 19 which has internal teeth for transmission of torque to a first input shaft of the transmission, and the clutch discs 18 of driven means of the clutch 3 are mounted on and extend radially outwardly from a second cupped holder 20 which extends in part into the cupped holder 19 and has internal teeth for transmission of torque to a second input shaft of the transmission. The clutch discs 17 are movable axially of the substantially cylindrical radially outermost portion 65 of the holder 19, and the clutch discs 18 are movable axially of the substantially cylindrical radially outermost portion 63 of the holder 20. A split ring 65 is recessed into an internal groove of the holder 20 to limit the extent of axial movability of clutch discs 18 relative to the cylindrical portion 63.

The flange 21 of the housing 4 is rotatably mounted on a suitable support, e.g., a housing (not shown). The means for rigidly connecting the tubular section 5 of the housing 4 with the flange 21 and with the intermediate member 22 comprises a set of axially parallel screws, bolts or similar fasteners 23 each having a head outwardly adjacent the flange 21, a shank extending through registering bores or holes of the flange 21 and tubular section 5, and an externally threaded tip which extends into a tapped bore of the intermediate member 22.

The radially outermost portion 26 of the one-armed lever 24 which includes a single diaphragm spring is tiltable relative to the housing 4 in that it is received in an internal annular groove between the end 5a of the tubular section 5 and the intermediate member 22. An intermediate portion of the lever 24 abuts a ring-shaped protuberance or seat of the axially movable pressure plate 10 of the clutch 3, and the radially innermost portion of the lever 24 is engaged by the radially outermost portion of a dished motion transmitting member or actuator 25 which is installed in an internal space 39 of the housing 4 and can be moved axially by the prestressed lever or diaphragm spring 24 or by the cylindrical extension 46 of a piston 45 forming part of the cylinder and piston unit 41, i.e., of the operating means of the clutch 3. When the piston 45 is caused to move axially in a direction to the right (as seen in FIGS. 1 and 1a), its cylindrical extension 46 pushes the actuator 25 in the same direction whereby the radially outermost portion of the lever 24 is tilted relative to the housing 4 and the intermediate portion of the lever 24 shifts the pressure plate 10 axially toward the partition 6 so that the clutch disc 8 can transmit torque to the clutch discs 18 whereby the internal teeth of the holder 20 transmit torque to the respective input shaft of the transmission. When the pressure of fluid in the working chamber 72 of the cylinder and piston unit 41 is reduced, the radially inwardly extending prongs of the lever 24 are free to move the actuator 25 back to the axial position of FIGS. 1 and 1a so that the clutch disc 8 of the driving means ceases to transmit torque to the clutch discs 18 of the driven means of the clutch 3.

The intermediate member 22 of the housing 4 is located between the levers 24 and 30, and the lever 24 is located between the lever 30 and the driving and driven means of the clutches 2, 3. Therefore, the clutch 2 further comprises means for pulling the axially movable pressure plate 9 toward the partition 6 in order to ensure that the clutch discs 7 can transmit torque to the clutch discs 17 which, in turn, then transmit torque to the corresponding holder 19 and to the respective input shaft of the transmission. The pulling means includes a set of axially parallel bolts 27 which are installed in the housing 4 radially outwardly of the clutch discs 7, 8, 17 and 18. The median portions of shanks of the bolts 27 are reciprocable in axially parallel bores or holes of tubular section 5 and intermediate member 22 of the housing 4. As can be seen in FIG. 2, the extensions 13, 15, 16 of the clutch discs 7, clutch disc 8 and pressure plate 10 have radially inwardly extending substantially V-shaped recesses or notches 28 for adjacent portions of the bolts 27. One end portion of each bolt 27 is threadedly and/or otherwise connected to the pressure plate 9 so that these bolts share all axial movements of the pressure plate 9 and vice versa. The other end portion of each bolt 27 is affixed to a ring-shaped force transmitting element 29 which can cause the pressure plate 9 to move axially toward or away from the partition 6. The latter can be said to constitute an axially fixed pressure plate for the adjacent clutch discs 17, 18 of both clutches.

The force transmitting member 29 (hereinafter called ring for short) can be moved axially by the radially outermost portion of the lever 30. An intermediate portion 30a of the lever 30 is tiltable relative to an annular seat 48 of the intermediate member 22 of the housing 4, and the radially innermost portion of the lever 30 is in engagement with a radially outwardly extending portion or collar 47a of a cupped piston 47 forming part of the cylinder and piston unit 40. The ring 29 is also provided with a seat (shown at 29a) which enables the radially outermost portion of the lever 30 to be tilted relative to the ring 29 when the piston 47 and its collar 47a are caused to move axially in a direction to the right, as seen in FIGS. 1 and 1a. The lever 30 (namely its two-piece diaphragm spring) is installed in prestressed condition and permanently urges the piston 47 in a direction to expel a fluid from the working chamber 73 of the cylinder and piston unit 40.

Each bolt 27 of the means for pulling the pressure plate 9 of the clutch 2 toward the partition 6 comprises a larger-diameter median portion 27b and two smaller-diameter end portions 27a which are provided with external threads mating with internal threads of nuts 31 one of which urges the pressure plate 9 against a shoulder 27c between the median portion 27b and the right-hand end portion 27a and the other of which urges the ring 29 against the shoulder 27c between the median portion 27b and the left-hand end portion 27a. A smaller-diameter portion 29b of the ring 29 is centered within an undercut cylindrical end portion 22a of the intermediate member 22. The portion 29b is axially movable in the cylindrical end portion 22a to the extent which is necessary to move the pressure plate 9 between the retracted position of FIGS. 1, 1a and an operative position in which the clutch 2 can transmit torque from the engine to the transmission. The clutch 2 is a starter clutch and the number of its clutch discs 7, 17 exceeds the number of clutch discs 8, 18 in the clutch 3. The cylindrical portion 22a of the intermediate member 22 (i.e., of the housing 4) ensures that the axis of the ring 29 coincides with the common axis of rotation of the clutches 2 and 3. As can be seen in FIGS. 1 and 1a, the levers 30, 24 of operating means of the clutches 2, 3 are disposed at those sides of driving and driven means of the two clutches which face toward the engine, and the radially inwardly extending portion of the intermediate member 22 is located between the two levers. The seat 29a of the ring 29 faces toward the radially inwardly extending portion of the intermediate member 22.

The radially innermost portion of the intermediate member 22 has a plurality of suitably distributed projections or protuberances 32 which extend in the axial direction of the clutches 2, 3 and through the radially disposed slots 34 between the radially inwardly extending prongs 33 of the lever 30. The projections 32 cooperate with the edge faces of adjacent prongs 33 to hold the lever 30 against rotation relative to the housing 4. The end faces 32a of projections 32 abut a carrier 35 which serves as a means for rotatably mounting the clutch assembly 1 in the aforementioned case 36. The carrier 35 is bolted, screwed or otherwise securely affixed to the projections 32 of intermediate member 22 of the housing 4.

The carrier 35 is an element of the housing 4 and includes a radially extending flange-like portion 37 and a protuberance 38 in the form of a stub extending axially in a direction away from the internal space 39 of the housing 4 toward the internal combustion engine. The engine drives the stub 38 so that the carrier 35 constitutes an input element of the multiple clutch assembly 1 in that it transmits torque to the housing 4 and hence to the driving means 6, 9, 7 of the clutch 2 as well as to the driving means 6, 10, 8 of the clutch 3.

The cylinder and piston units 40, 41 for the levers 30, 24 of the clutches 2, 3 are installed in the internal space 39 of the housing 4. These units comprise a common axially extending cylinder 42, the aforementioned piston 47 (forming part of the unit 40) which surrounds the cylinder 42, and the aforementioned piston 45 (forming part of the unit 41) which is installed in the cylinder 42. In accordance with a feature of the invention, the unit 41 is at least partially confined in the unit 40 in that the piston 45 is telescoped into the cylinder 42 which, in turn, is telescoped into the piston 47. The cylinder 42 is rigidly connected to the radially outwardly extending flange 37 of the carrier 35 by a set of screws 43 or other suitable fastener means.

The cylinder 42 comprises a hollow cylindrical radially outermost portion 42a which is surrounded by the cupped piston 47, a radially inwardly extending portion 42b which resembles a washer, and a hollow cylindrical radially innermost portion 42c which surrounds the axial extension 46 of the piston 45. The latter is reciprocable within the hollow cylindrical portion 42a. The cylindrical portion 42a extends toward the engine, and the cylindrical portion 42c extends into the internal space 39 of the housing 4. The radially extending portion 42b of the cylinder 42, the hollow cylindrical portion 42a of the cylinder 42 and the carrier 35 jointly define an annular compartment 44 for the piston 45. As explained hereinbefore, the axial extension 46 of the piston 45 extends axially within and beyond the inner cylindrical portion 42c of the cylinder 42 and into the internal space 39 of the housing 4 to cooperate with the radially innermost portion of the cupped actuator 25 for the lever 24 of the clutch 3.

The piston 47 resembles a cup and is slidably guided by the external surfaces of hollow cylindrical portions 42a and 42c of the cylinder 42. Suitable seals (e.g., O-rings) are installed in internal grooves of the piston 45 and sealingly engage the respective portions 42a, 42c of the cylinder 42. The radially outermost portion 47a of the piston 47 constitutes or resembles a collar which engages the radially innermost portion of the lever 30 forming part of operating means of the clutch 2. The collar 47a is adjacent the flange 37 of the carrier 35. When the piston 47 is caused to move axially relative to the cylinder 42 in response to admission of pressurized fluid into the corresponding working chamber 73, the lever 30 is tilted at 48 in a sense to reduce its conicity and to move it away from the flange 37, i.e., the piston 47 then causes the bolts 27 to pull the pressure plate 9 toward the partition 6 of the housing 4. The seat 48 can constitute a circumferentially complete annular body or it may consist of a plurality of discrete lobes extending from the respective side of the radially extending portion of the intermediate member 22. As mentioned above, the lever 30 is a two-armed lever because it is fulcrumed at 48 intermediate its ends, because one of its arms (the radially innermost portion) cooperates with the piston 47 and because its radially outermost portion cooperates with the ring 29 and hence with the means (including the bolts 27) for pulling the pressure plate 9 of the clutch 2 toward the partition 6.

The means for cooling the clutches 2 and 3 comprises axially parallel conduits 49 and 50 forming part of means for conveying a suitable coolant (e.g., oil) from a source 71 to the respective clutches. The conduits 49 which deliver coolant to the clutch 2 are longer than the conduits 50 which serve to deliver coolant to the clutch 3. The conduits 49, 50 extend through the slots 34 of the lever 30 and through the registering slots 51 of the lever 24. The slots 34 alternate with the aforementioned prongs 33 of the lever 30, and the slots 51 alternate with the prongs of the lever 24. As can be seen in FIGS. 1 and 1a, the conduits 49, 50 of the coolant conveying means are disposed radially outwardly of the cylinder and piston units 40, 41 and radially inwardly of the clutch discs 17, 18 of the clutches 2, 3. The cupped actuator 25 is also disposed radially inwardly of the conduits 49 and 50. The coolant-receiving end portions or inlets of the conduits 49, 50 are anchored in axially parallel bores of the flange 37. For example, the inlet of each conduit 49, 50 can be a press fit in the flange 37, and such inlets can receive coolant from an annular channel 52 having an open inner side (facing toward the common axis of the clutches 2, 3) and being machined into or otherwise formed in the carrier 35. The channel 52 is adjacent that portion of the flange 37 which faces away from the internal space 39 of the housing 4.

The channel 52 is actually defined by a ring-shaped metallic trough 54 which is inserted into an annular cutout 52a provided in a component 53 forming part of the carrier 35 and being affixed to the flange 37. The configuration of the trough 54 can be seen in FIG. 1a, i.e., this trough is configurated to ensure that the inner side of the channel 52 is open. The cutout 52a is a circumferentially complete annular groove which is machined into the component 53 in the axial direction of the clutches 2 and 3. The component 53 is affixed to the flange 37 by threaded fasteners which secure the carrier 35 to the intermediate member 22 of the housing 4. Such fasteners extend into tapped bores which are provided in the end faces 32a of projections 32 of the intermediate member 22. The component 53 has a radially innermost portion 53a which constitutes the seat for one race of an antifriction bearing 53b interposed between the rotary housing 4 of the multiple clutch assembly 1 and the case 36.

The outlets or discharge ends 50a of the conduits 50 are located substantially at the level of the median portion of the package including the clutch discs 8, 18 of the clutch 3 (as seen in the axial direction of the clutches). This ensures that coolant which is discharged by the conduits 50 is at least substantially uniformly distributed upon the clutch discs 8 and 18. The coolant supplying means further comprises means for regulating the flow of coolant through the outlets 50a of the conduits 50. The illustrated flow regulating means comprises a plate-like valve 55 which can at least partially seal the outlets 50a when the clutch 3 is disengaged, i.e., when the lever 24 is permitted to assume the shape which is shown in FIGS. 1, 1a and in which the pressure plate 10 is not urged toward the partition 6. To this end, the valve 55 is mounted on the axially movable actuator 25 for the lever 24. As can be seen in FIG. 1, the valve 55 at least partially seals the outlets 50a of the conduits 50 when the clutch 33 is disengaged to thus avoid unnecessary cooling of the clutch discs 8 and 18 while the discs 8 are free to rotate relative to the discs 18. The plate-like valve 55 can be made of a springy material which enables this valve to flex in the axial direction of the clutches 2 and 3.

FIG. 1 further shows that the piston 47 and the actuator 25 are cupped in the same axial direction, namely away from the engine and from the carrier 35. The axially extending radially outermost portion of the actuator 25 at least partially surrounds the piston 47 with requisite play to ensure that the piston 47 can move axially with reference to the cylinder 42 in order to enable the lever 30 to increase its conicity as a result of prestressing or to cause the lever 30 to reduce its conicity and to thereby pull the pressure plate 9 toward the partition 6 through the medium of the bolts 27. FIG. 1 shows the piston 47 and the actuator 25 in their leftmost positions.

The discharge ends or outlets of the relatively long conduits 49 extend to the median portion of the package including the clutch discs 7 and 17 of the clutch 2.

The holders 19, 20 of clutch discs 17, 18 are cupped, and the holder 20 extends at least in part into the holder 19. The radially innermost portion of the holder 19 constitutes an internally toothed hub 56 which can transmit torque to the corresponding input element of the transmission. The holder 19 further includes an intermediate portion 57 which extends radially outwardly from the hub 56 and merges into a hollow cylindrical portion 58 having axially parallel recesses 59 for the radially innermost portions of clutch discs 17. At least a part of the intermediate portion 57 slopes radially and axially outwardly toward the partition 6 of the housing 4. The clutch discs 17 have extensions 17a which project into the recesses 59 of the cylindrical portion 58. The extensions 17a transmit torque from the housing 4 to the holder 19 when the clutch 2 is engaged.

The holder 20 also comprises a radially innermost portion 60 in the form of an internally toothed hub which serves to transmit torque to an input element of the transmission when the clutch 3 is engaged. The holder 20 further comprises a radially outwardly extending intermediate portion 61 which extends from the hub 60 toward the tubular section 5 of the housing 4, and a first cylindrical portion 62 which merges into the intermediate portion 61 and has openings 66 in register with the discharge ends of the conduits 49. The first cylindrical portion 62 merges into the aforementioned (second) cylindrical portion 63 which has axially parallel slots 64 for the radially outwardly projecting extensions 18a of the clutch discs 18. The first cylindrical portion 62 of the holder 20 is inwardly adjacent the cylindrical portion 58 of the holder 19. The diameter of cylindrical portion 58 of the holder 19 matches or approximates the diameter of second cylindrical portion 63 of the holder 20. The extensions 18a of the clutch discs 18 serve to transmit torque to the holder 20 when the clutch 3 is engaged, i.e., when the clutch discs 18 are compelled to rotate with the housing 4. The means for limiting axial movements of clutch discs 18 relative to the second cylindrical portion 63 of the holder 20 includes the split ring 65 which extends in part into an internal groove of the cylindrical portion 63 to the left of the clutch discs 18 (as seen in FIGS. 1 and 1a).

The clutch 2 comprises means for preventing axial movements of the holder 19 relative to and beyond the extensions 17a of the clutch discs 17. This is ensured by limiting the axial movability of the entire holder 19 relative to the housing 4 and hence with reference to the clutch discs 7 and 17. To this end, the hub 56 of the holder 19 is movable axially within limits which are imposed by the flange 21 of the housing 4 on the one hand, and by the hub 60 of the holder 20 on the other hand. The hub 56 can be received between the hub 56 and the flange 21 with a very small axial play, e.g., with a play in the range of 1-2 mm.

As mentioned above, the smaller-diameter cylindrical portion 62 of the holder 20 is provided with openings 66 for the flow of coolant from the outlets of the conduits 49 toward the clutch discs 7, 17 of the clutch 2. The cylindrical portion 62 of the holder 20 further carries a pan-shaped annular coolant collecting and distributing member 67. That end portion of the coolant collecting and distributing member 67 which is remote from the radially extending portion 61 (as seen in the axial direction of the clutches 2 and 3) is bent radially inwardly, as at 68, to ensure that coolant which is discharged by the conduits 49 cannot reach the clutch discs 8 and 18 of the clutch 3. The member 67 is formed with openings which register with the openings 66 of the cylindrical portion 62 so as to enable coolant issuing from the conduits 49 to reach the clutch discs 7 and 17. The axial and/or other dimensions of openings in the member 67 can deviate from the corresponding dimensions of the respective openings 66; this can serve to ensure a more uniform distribution of coolant upon the clutch discs 17 of the clutch 2. A highly satisfactory distribution of such coolant can be ensured by appropriate selection of the length (axial dimensions) of openings 66 and of the openings in the member 67.

The multiple clutch assembly 1 further comprises means for supplying a pressurized hydraulic fluid to the cylinder and piston units 40 and 41. The fluid supplying means includes a source of pressurized fluid (preferably the aforementioned pump 71 which also constitutes or forms part of a source of coolant) and means for conveying fluid from the source to the working chambers 73, 72 of the units 40 and 41. The conveying means includes annular grooves or channels 69, 70 which are machined into or are otherwise formed in the external surface of the stub 38 which extends into an axial bore of the case 36. The grooves 69, 70 receive fluid from the pump 71 (which is affixed to the case 36) by way of suitable valves which are not shown in the drawing. The groove 69 of the stub 38 communicates with at least one axially parallel bore 74 which is provided in the stub 38 and conveys pressurized fluid into the working chamber 72 of the cylinder and piston unit 41. The groove 70 of the stub 38 communicates with at least one axially parallel bore 75 which is provided in the stub 38 and discharges pressurized fluid into at least one radially outwardly extending bore 76 of the flange 37. The right-hand end of the bore 75 is sealed, the same as the radially outermost portion of the bore 76. The latter communicates with an axially parallel bore 77 which can deliver pressurized fluid into the working chamber 73 of the unit 40. The carrier 35 and its parts 37, 38 can be said to constitute elements of the housing 4, and the aforementioned channels and bores in the stub 38 and flange 37 can be said to constitute passages which convey pressurized fluid from the source (pump 71) to the working chambers 72 and 73. The bore 77 is in register with a bore in the cylinder portion 42a, and the bore in the portion 42a admits fluid directly into the working chamber 73.

The case 36 receives lubricant (e.g., oil) from the pump 71 by way of a non-illustrated system of grooves, channels and/or otherwise configured passages, and the case 36 has at least one coolant supplying port 78 which delivers coolant to the annular channel 52 for admission of coolant into the inlets of the conduits 49 and 50. The port or ports 38 are disposed radially inwardly of the channel 52 so that, when the discharged coolant is set in rotary motion by the rotating housing 4 of the multiple clutch assembly 1, it is forced to leave the channel 52 and to flow into the conduits 49, 50 under the action of centrifugal force. Though FIG. 1 shows a single port 78, the case 36 can be provided with an annulus of preferably uniformly distributed ports for admission of coolant into the channel 52 wherein the body of coolant rotates and is forced to penetrate into the conduits 49, 50 under the action of centrifugal force.

The pump 71 is driven by the engine, and more specifically by an annulus of gear teeth 79 which are provided on the stub 38 of the carrier 35.

The free end portion of the stub 38 is formed with an annulus of external teeth 80 which receive torque from the surrounding hub 81 of a torsional vibration damping device 82. The latter includes a flywheel 85 which is driven by the crankshaft (not shown) of the engine, and means for transmitting torque from: the flywheel 85 to the hub 81, i.e., to the stub 38 and to the entire housing 4 of the assembly 1. The torque transmitting means comprises at least one slip clutch 84 which is in series with at least one elastic damper 83, e.g., a damper of the type well known from the art of devices for transmitting torque between the crankshaft of an engine and a friction clutch which can be engaged to transmit torque to the input element of a variable speed transmission. Reference may be had to numerous United States and foreign patents and patent applications of the assignee of the present application. For example, the damper 83 can comprise a set of substantially tangentially disposed coil springs operating between an input element which receives torque from the slip clutch 84 and an output element which constitutes or drives the hub 81.

The exact details of the slip clutch 84 form no part of the present invention. This slip clutch can comprise a diaphragm spring which biases the input element of the damper 83 into indirect torque-receiving engagement with the flywheel 85 through the medium of one or more friction generating washers or the like.

The multiple clutch assembly 1 of FIGS. 1, 1a and 2 can be used in automated transmissions of the type wherein one of the clutches (such as the clutch 2 which comprises a larger number of clutch discs) is a starter clutch and both clutches are engaged during a change of gear ratio for power shifting. This ensures practically uninterrupted transmission of torque between the engine and the transmission.

The diaphragm springs which constitute the levers 30, 24 of the clutches 2 and 3 are installed in prestressed condition in such a way that they tend to assume positions in which the respective driven means (including the clutch discs 17, 18) are disengaged from the corresponding driving means (including the clutch discs 7 and 8). Thus, the radially innermost portion of the lever 30 tends to expel fluid from the working chamber 73 through the medium of the piston 47, and the lever 24 tends to expel fluid from the working chamber 72 through the medium of the piston 45. At the same time, the lever 30 causes or permits the pressure plate 9 of the clutch 2 to move away from the partition 6, and the lever 24 causes or permits the pressure plate 10 to move away from the partition 6. The conicity of the lever 30 is reduced in response to admission of pressurized fluid into the working chamber 73 because the piston 47 then moves axially and away from the carrier 35, and the coniticy of the lever 24 is reduced in response to admission of pressurized fluid into the working chamber 72 because the piston 45 then moves in the compartment 44 toward the radially extending portion 42b of the cylinder 42. The magnitude of torque which is transmitted by the clutches 2 and 3 depends on the pressure of fluid in the respective working chambers 73 and 72.

It is within the purview of the invention to modify at least one of the clutches in such a way that the prestressed lever of the one clutch tends to maintain the respective driving means in torque transmitting engagement with the associated driven means. The cylinder and piston unit of the one clutch then serves as a means for disengaging the clutch by causing the corresponding lever to assume a position in which the driving means of the one clutch is free to rotate relative to the corresponding driven means.

It is further possible to modify the illustrated multiple clutch assembly 1 in such a way that the flange 21 of the housing 4 is omitted, i.e., that only one axial end of the housing is rotatably mounted on a suitable support, e.g., on or in the transmission case 36. It is then desirable to provide at least one additional antifriction bearing which is axially spaced apart from the antifriction bearing 53b so that the stub 38 can rotate relative to the case 36 in several axially spaced-apart bearings. For example, a second antifriction bearing can be installed adjacent the gear teeth 79 for the pump 71, either at that side of the gear teeth 79 which faces toward the clutches 2, 3 or at the other side of such gear teeth. Of course, the illustrated stub 38 is replaced with a longer stub if the additional bearing is installed at the left-hand side of the gear teeth 79. In addition, the case 36 is then modified so that it can accommodate the longer stub and/or the additional bearing or bearings for the housing 4.

An important advantage of the feature that one (41) of the cylinder and piston units 40, 41 is at least partially confined in the other unit is that this contributes to compactness of the cylinder and piston units (they can employ a common cylinder 42 which surrounds the piston 45 and is surrounded by the piston 47) and to simplicity and compactness of entire operating means in each of the clutches 2 and 3. Still further, this renders it possible to simplify and reduce the space requirements of the means for supplying pressurized fluid to the working chambers 73, 72 of the cylinder and piston units 40, 41. In fact, and as shown in FIGS. 1 and 1a, delivery of pressurized fluid to and outflow of spent fluid from the working chambers 72, 73 can take place at one side of the assembly 1, namely at the side facing the engine. Such arrangement renders it possible to reduce the overall length and the diameters of channels, bores, holes and/or other passages for the flow of fluid to and from the working chambers 72 and 73. Still further, this renders it possible to reduce the diameters of the cylinder and piston units 40, 41 which, in turn, renders it possible to avoid undesirable fluctuations of pressure of fluid which is used in the units 40, 41 because the centrifugal force acting upon the body of fluid in the two cylinder and piston units is relatively small. Moreover, the illustrated means for conveying fluid to and from the working chambers 72, 73 renders it possible to greatly reduce the initial stressing of diaphragm springs which form part of or constitute the levers 24 and 30 as well the pressure of fluid which is needed to engage the clutches by overcoming the initial stressing of the diaphragm springs. As mentioned above, each of the levers 24, 30 tends to disengage the respective clutch. However, and as will be explained with reference to FIGS. 3 and 3a, it is possible to design the improved multiple clutch assembly in such a way that one of the levers tends to engage and the other of the levers tends to disengage the respective clutch. Furthermore, the assembly 1 of FIGS. 1, 1a and 2 can be modified by replacing the one-armed lever 24 with a two-armed lever having one or more diaphragm springs.

The placing of driving and driven means of both clutches radially inwardly of the tubular section 5 of the housing 4, as well as the placing of cylinder and piston units 40, 41 radially inwardly of the driving and driven means, also contributes to compactness of the multiple clutch assembly. The same holds true for installation of the unit 41 radially inwardly of the unit 40. The illustrated arrangement of the cylinder and piston units, wherein one of the units extends axially into the other unit and the other unit extends radially around the one unit, has been found to be of particular advantage as regards the compactness and simplicity of the entire multiple clutch assembly. Thus, all that is necessary is to employ a cupped outer piston 47 which receives a cupped portion of the common cylinder 42, and to install the other piston 45 within the cylinder.

The illustrated design of the housing 4 renders it possible to assemble or dismantle the assembly 1 in a time-saving manner. Moreover, each of the clutches 2, 3 can occupy an allotted portion of the internal space 39 within the housing 4.

The radially innermost portion 42c of the cylinder 42 serves as a means for accurately centering and guiding the extension 46 of the inner piston 45. In addition, the cylindrical portion 42c cooperates with the adjacent O-ring of the outer piston 47 to seal the internal space 39 of the housing 4 from the working chamber 73.

The placing of bolts 27 radially outwardly of the driving and driven means of both clutches renders it possible to gain access to these belts without necessitating even partial dismantling of the housing 4.

The projections 32 can but need not constitute integral parts of the intermediate member 22 of the housing 4. It is also possible to provide the projections 32 on the flange 37 of the carrier 35 so that they abut the intermediate member 22 when the multiple clutch assembly 1 is ready for use.

The number of conduits 49, 50 for delivery of coolant to the clutch discs of the respective clutches can be varied within a wide range. It is presently preferred to provide a plurality of equidistant axially parallel conduits 49 and a plurality of equidistant axially parallel conduits 50 (see FIG. 2). As can be seen in FIGS. 1 and 1a, the conduits 49, 50 are preferably disposed radially inwardly of the projections 32 on the intermediate member 22 of the housing 4.

The valve 55 on the actuator 25 may but need not perform the additional function of ensuring a desirable uniform distribution of coolant upon the clutch discs 8 and 18. If desired or necessary, the valve 55 can serve exclusively as a means for regulating the rate of flow of coolant from the conduits 50, and the assembly 1 can be provided with separate means (e.g., with one or more baffles or the like) for ensuring satisfactory distribution of coolant upon the clutch discs of the clutch 3.

A valve which would regulate the flow of coolant from the outlets of the conduits 50 is not necessary or not critical because the clutch 2 is in use during starting as well as during changes of gear ratio. Sealing of outlets of the conduits 50 when the clutch 3 is disengaged brings about the additional advantage that a larger quantity of coolant can be conveyed via conduits 49 to cool the clutch discs 7, 17 of the starter clutch 2. Thus, during starting (slip stage of operation of the assembly 1) of torque transmission, the entire flow of coolant is directed upon the clutch discs 7, 17 which, at such time, generate large amounts of heat.

As mentioned above, the pump 71 can be provided with one or more first outlets for pressurized fluid which is to be admitted into the working chambers 73, 72 of the cylinder and piston units 40, 41 and with one or more discrete second outlets for coolant (e.g., by way of the casing 36).

Figure 3:
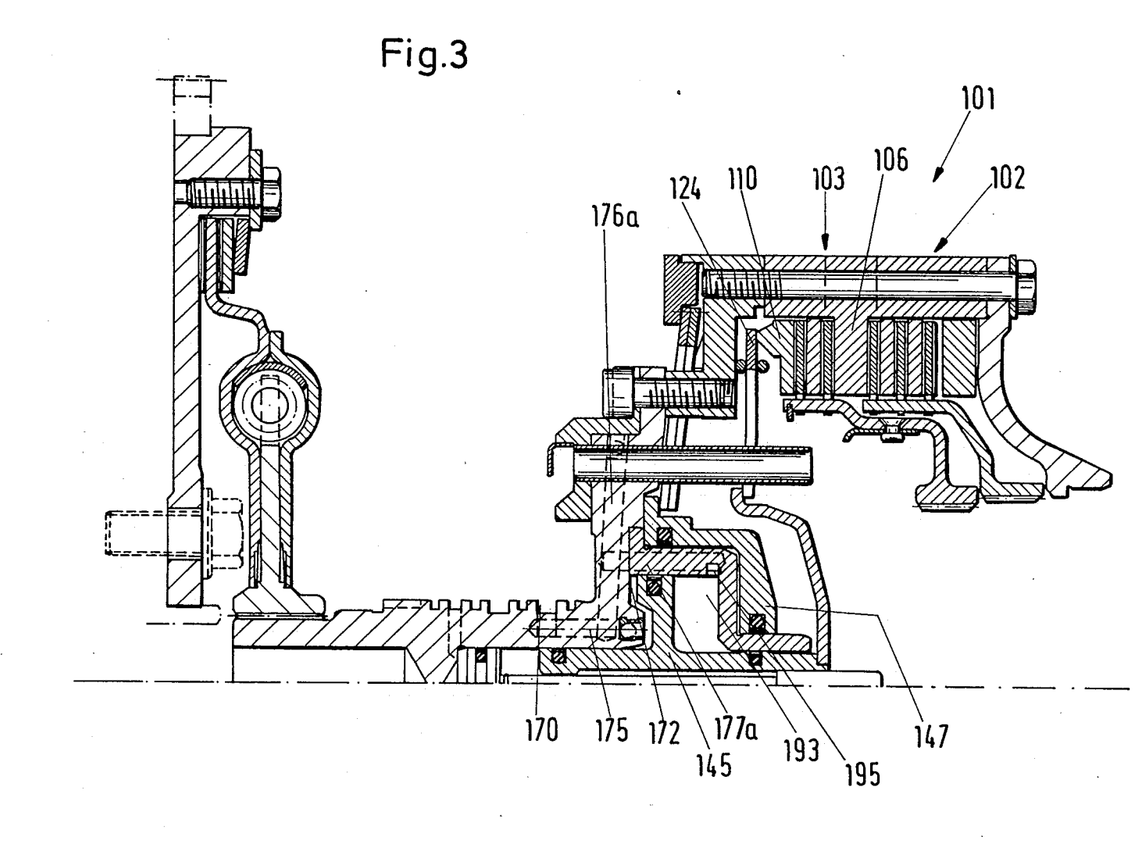
FIG. 3 is an axial sectional view of one-half of a modified multiple clutch assembly.
Figure 3A:
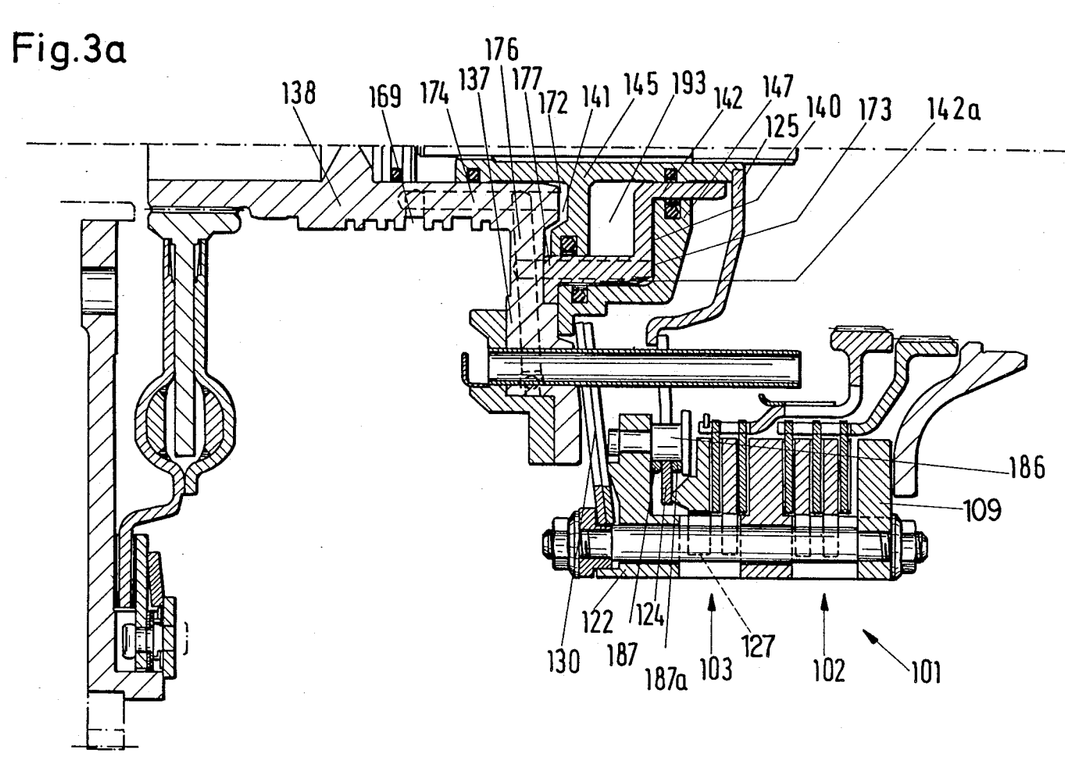
FIG. 3a is a similar axial sectional view of the other half of the modified multiple clutch assembly.

FIGS. 3 and 3a show certain parts of a modified multiple clutch assembly 101 wherein all such parts which are identical with or analogous to corresponding parts of the assembly 1 are denoted by similar reference characters plus 100. One of the differences between the assemblies 1 and 101 is that the prestressed diaphragm spring or lever 124 of the clutch 103 (which includes the pressure plate 110 and the piston 145 cf the cylinder and piston unit 141) tends to maintain the clutch 103 in engaged condition, i.e., the lever 124 tends to move the pressure plate 110 toward the partition 106 of the housing so as to ensure that the clutch disc of driving means of the clutch 103 transmits torque to the clutch discs of the driven means. Thus, the piston 145 must be moved axially in response to admission of pressurized fluid into the working chamber 172 of the cylinder and piston unit 141 in order to change the conicity of the diaphragm spring or lever 124 in a sense to permit the pressure plate 110 to move axially and away from the partition 106.

The mode of operation of the clutch 102 is the same as that of the clutch 2, i.e., the lever 130 tends to maintain the clutch 102 in disengaged condition.

The lever 124 is a two armed lever. Its central portion is tiltable between two annular seats 187, 187a which are attached to the housing (namely to the radially extending portion of the intermediate member 122 of the housing) by a set of axially parallel rivets 186 or in any other suitable way. The illustrated seats 187, 187a are simple wire rings. The radially outermost portion of the lever 124 is in engagement with the adjacent axially extending seat of the pressure plate 110, and the radially innermost portion of the lever 124 is in engagement with a radially outwardly extending collar of the actuator 125.

The feature that the lever 124 tends to engage the respective clutch 103 while the lever 130 tends to disengage the clutch 102 is desirable and advantageous because one of these clutches can be engaged and the other of these clutches can be disengaged by the simple expedient of simultaneously admitting pressurized fluid into the working chambers 173, 172 of both cylinder and piston units 140, 141. This entails a pronounced simplification of means for conveying pressurized fluid to the working chambers 173, 172 of the units 140 and 141. In fact, it is possible to provide a common passage for admission of fluid into and for evacuation of fluid from both working chambers.

The simplified means for conveying fluid to the cylinder and piston units 140, 141 comprises an external channel or groove 169 in the stub 138 which is received in a case or the like in the same way as described in connection with FIGS. 1, 1a and 2. The channel 169 receives pressurized fluid from a suitable source (such as a pump corresponding to the pump 71 of FIG. 1) by way of one or more conduits and regulating valve means, not shown.

The fluid conveying means further comprises an axially parallel channel or passage 174 which is drilled into or is otherwise formed in the stub 138 and delivers fluid to the working chamber 172 of the cylinder and piston unit 141 (i.e., of operating means of the clutch 103). The intake end of the channel 174 communicates with the channel 169. The flange 137 of the carrier has a radially extending channel or passage 176 which receives fluid from the channel 174 and is closed at its radially outermost end. The channel 176 admits pressurized fluid into an axially parallel channel or passage 177 which discharges into the working chamber 173 of the cylinder and piston unit 140 forming part of the clutch 102. The channel 177 is provided in the cylindrical portion 142a of the cylinder 142.

The channels 174, 176, 177 communicatively connect the working chambers 172, 173 to each other.

The mode of operation of the multiple clutch assembly 101 will be explained with reference to FIGS. 3, 3a as well as with repeated reference to the diagram of FIG. 4 wherein the time (t) is measured along the abscissa and the pressure (P) in the working chambers 172, 173 is measured along the ordinate. The magnitude of torque (Md) which is transmitted by the clutches 102, 103 is also measured along the ordinate.

The straight line 188 denotes one mode of regulating the magnitude of torque which is transmitted by the clutch 103 in the course of a gear shifting operation. The clutch 103 constitutes the starter clutch of the assembly 101.

The phantom line 189 denotes one possible progress of transmission of torque by the clutch 102 in the course of a gear shifting operation, and the broken line 190 denotes the manner in which the pressure in the working chambers 172, 173 can vary between the instants $t_1$ and $t_4$.

If a gear shifting operation is started at the instant $t_1$, this involves admission of pressurized fluid into the working chambers 172, 173 whereby the pressure of fluid in the working chambers rises in a manner as indicated by the broken line 190. Consequently, the clutch 103 is gradually disengaged and the clutch 102 is gradually engaged. As can be seen in the diagram of FIG. 4, the magnitude of torque which is transmitted by the clutch 103 begins to decrease in intermediate response to admission of pressurized fluid at the instant $t_1$ because the piston 145 immediately begins to tilt the lever 124 in a sense to move the radially outermost portion of the lever 124 away from the partition 106, i.e., the pressure plate 110 is free to move away from the adjacent clutch discs of the clutch 103. Thus, pressurized fluid which is admitted into the working chamber 172 of the cylinder and piston unit 141 immediately opposes and counteracts the bias of the lever 124.

The clutch 102 is engaged at the instant $t_2$, i.e., with a delay following the start of admission of pressurized fluid into the working chamber 173 of the cylinder and piston unit 140. This is due to the fact that the pressure of fluid in the working chamber 173 must rise to a certain level before the bias of the lever 130 is overcome so that the radially outermost portion of the lever 130 causes the bolts 127 to pull the pressure plate 109 toward the partition 106. In other words, it is necessary to build up the pressure in the working chamber 173 in order to overcome the bias of the radially innermost portion of the lever 130 upon the piston 147 of the unit 140. The point 191 denotes that pressure of fluid in the chamber 173 at which the lever 130 begins to tilt relative to the intermediate member 122 of the housing so that it begins to pull the pressure plate 109 toward the partition 106.

The clutch 102 becomes gradually engaged after the instant $t_2$ and the magnitude of torque which is being transmitted by the clutch 102 increases in a manner as denoted by the phantom line 189.

The clutch 103 is fully disengaged at the instant $t_3$, i.e., ahead of the instant $t_4$ of full engagement of the clutch: 102. The pressure of fluid in the working chambers 172, 173 reaches a maximum value (indicated at 192) at the instant $t_4$.

In order to prevent excessive stressing of the lever 124 by the piston 145, the assembly 101 comprises means for limiting the extent of axial movability of the piston 145 in a direction to disengage the clutch 103. This is achieved by appropriate shaping of the cylinder 142 which arrest the piston 145 when the latter reduces the volume of the right-hand portion of the annular compartment 193 to zero, i.e., when its radially extending portion reaches and abuts the radially extending portion of the cylinder 142.

Figure 4:
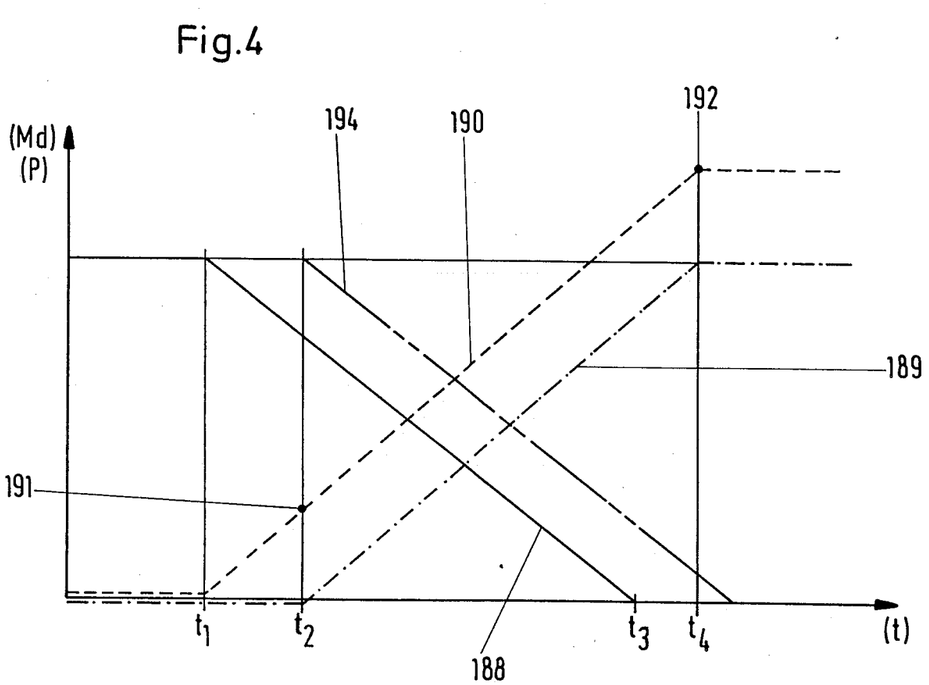

The diagram of FIG. 4 denotes the operation of the multiple clutch assembly 101 under ideal circumstances, i.e., by disregarding certain parameters which can influence the variations of torque Md and fluid pressure P. For example, the diagram of FIG. 4 does not take into consideration unavoidable delays which take place as a result of the characteristics of means for initiating the admission of pressurized fluid into the working chambers 172, 173. At least some clearances invariably exist between the driving and driven clutch discs in disengaged condition of the clutches 102, 103. Such clearances must be eliminated before the respective clutches begin to transmit torque, and this is not considered in the diagram of FIG. 4.

The lines 188, 189 can be shifted relative to each other, depending upon the desired operation of the multiple clutch assembly 101. Furthermore, the inclination of lines 188, 189 can be altered for the same reason. For example, by reducing the initial stress (restoring force) of the lever 130 upon the piston 147, the line 189 can be shifted to the left (toward the ordinate of the diagram of FIG. 4) to thus reduce the length of the interval between the instants $t_1$ and $t_2$ as well as to increase the maximum torque which can be transmitted by the clutch 102. The line 189 is shifted to the right in response to increased initial stressing of the lever 130.

The overlapping of torques which are transmitted by the clutches 102, 103 in the course of a gear shifting operation can be influenced by building up a pressure in the annular compartment 193 between the cylinder 142 and the inner piston 145. Such pressure opposes the pressure of fluid in the working chamber 172 of the cylinder and piston unit 141. The buildup of fluid pressure in the compartment 193 entails a shifting of the line 188 in a direction to the right, i.e., away from the ordinate in the diagram of FIG. 4. For example, the pressure of fluid medium which is admitted into the compartment 193 can be selected in such a way that actuation of the clutch 102 takes place simultaneously or substantially simultaneously with actuation of the clutch 103. All that is necessary is to select the pressure of fluid medium which is admitted into the compartment 193 in such a way that the magnitude of force acting upon the piston 145 in a direction to the left (as seen in FIGS. 3 and 3a) equals or approximates the magnitude of force acting upon the piston 145 in the opposite direction. In other words, the force which is applied by the medium in the compartment 193 against the piston 145 should or can equal the force which the lever 130 applies to the piston 147. The magnitude of torque which is transmitted by the clutch 103 under the just outlined circumstances is denoted in the diagram of FIG. 4 by a line 194.

Referring again to FIGS. 3 and 3a, the manner in which the annular compartment 193 receives a pressurized fluid medium is as follows: The stub 138 has an external channel or groove 170 which receives pressurized fluid from the pump 71 (not shown in FIGS. 3 and 3a) by way of one or more channels, bores or other passages and one or more valves. The channel 170 discharges pressurized fluid into an axially parallel channel or passage 175 which is provided in the stub 138 and is sealed at its right-hand end. The channel 175 admits pressurized fluid into a radially extending bore 176a having a sealed radially outermost end and serving to admit pressurized fluid into an axially parallel channel or bore 177a. The outlet 195 of the channel 177a communicates with the compartment 193. The channel 177a is machined into the cylinder 142, the same as the aforementioned channel 177.

In all other respects, the construction and mode of operation of the multiple clutch assembly 101 are or can be identical with or analogous to the construction and mode of operation of the assembly 1 of FIGS. 1, 1a and 2.

The pressure of fluid in the working chamber 172 can match the pressure of fluid in the working chamber 173. This is achieved by the channels 174, 176, 177 which connect the working chambers 172, 173 to each other.

The compartment 193 is integrated into the cylinder and piston unit 141 and is separated from the respective working chamber 172 by the piston 145 of the unit 141. The magnitude of the force which is applied to the piston 145 by pressurized fluid medium in the compartment 193 can amount to 60% (normally to 5–40%) of maximum force which is applied to the piston 145 by pressurized fluid in the working chamber 172.

Without further analysis, the foregoing will so fully reveal the gist of the present invention that others can, by applying current knowledge, readily adapt it for various applicators without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A multiple clutch assembly, particularly for use with automatic transmissions, wherein one clutch of the assembly is operative to start the transmission of torque from an input element to at least one output element and plural clutches are operative to transmit torque during a change of gear ratio for power shifting, comprising first and second clutches each having rotary driving and driven means and operating means actuatable to selectively couple said driving means with an disconnect said driving means from the respective driven means, each of said operating means comprising a lever including at least one prestressed diaphragm spring and a cylinder and piston unit for moving the respective lever between a first position in which the respective driving and driven means are coupled to each other and a second position in which the respective driving and driven means are disconnected from said other, one of said units being at least partially confined in the other of said units and said levers being disposed at the same side of the respective driven means.

2. The assembly of claim 1, wherein said units are coaxial and said one unit is axially telescoped into said other unit.

3. The assembly of claim 1, wherein one of said levers is disposed between the other of said levers and said driven means.

4. The assembly of claim 1, wherein one of said levers is a two-armed lever.

5. The assembly of claim 1, wherein one of said levers is a one-armed lever.

6. The assembly of claim 1, wherein each of said levers is a two-armed lever.

7. The assembly of claim 1, wherein one of said diaphragm springs is prestressed to urge the respective lever to said first position.

8. The assembly of claim 1, wherein each of said diaphragm springs is prestressed to urge the respective lever to said second position.

9. The assembly of claim 1, further comprising a housing for said clutches, said units being disposed in said housing radially inwardly of said driving and driven means.

10. The assembly of claim 9, wherein said one unit is disposed radially inwardly of said other unit.

11. The assembly of claim 1, further comprising a housing for said clutches, said units having a common cylinder which is rigid with said housing.

12. The assembly of claim 11, wherein said units have coaxial pistons which are reciprocable relative to said common cylinder.

13. The assembly of claim 12, wherein one of said pistons is disposed in and the other of said pistons surrounds said common cylinder.

14. The assembly of claim 1, further comprising a housing for said clutches, the driving and driven means of each of said clutches including an axially movable member and each of said units including an axially movable piston, each of said levers including a first portion at least indirectly engageable by the respective piston, a second portion disposed radially outwardly of the first portion and tiltably mounted in said housing, and a third portion disposed radially outwardly of the first portion and engageable with the respective axially movable member.

15. The assembly of claim 14, wherein at least one of said axially movable members comprises a pressure plate.

16. The assembly of claim 1, further comprising a housing for said clutches, said housing including a tubular section having a first end and a second end, and a substantially washer-like partition extending substantially radially inwardly from said tubular section intermediate said ends, said levers and the driving and driven means of said first clutch being disposed at one side of said partition.

17. The assembly of claim 16, wherein the driving and driven means of said second clutch are disposed at the other side of said partition.

18. The assembly of claim 16, wherein the driving means of said first clutch includes an axially movable pressure plate and each of said units includes an axially movable piston, the lever of said first clutch including a first portion at least indirectly engageable with the respective piston, a second portion disposed radially outwardly of said first portion and at least indirectly engageable with said pressure plate, and a third portion disposed radially outwardly of said second portion and tiltably mounted in said housing.

19. The assembly of claim 16, wherein the driving means of said first clutch includes an axially movable pressure plate and each of said units includes an axially movable piston, the lever of said first clutch including a first portion at least indirectly engageable with the respective piston, a second portion disposed radially outwardly of said first portion and tiltably mounted in said housing, and a third portion disposed radially outwardly of said second portion and engageable with said pressure plate.

20. The assembly of claim 16, wherein the driving and driven means of said second clutch are disposed at the other side of said partition and include an axially movable member, said units including pistons and the lever of said second clutch including a first portion at least indirectly engageable with the respective piston, a second portion located radially outwardly of said first portion and tiltably mounted in said housing, and a third portion located radially outwardly of said second portion and movable relative to said housing in response to tilting of said second portion, said second clutch further comprising means for pulling said member toward said partition in response to tilting of said second portion.

21. The assembly of claim 20, wherein said pulling means is disposed radially outwardly of the driven means of said clutches.

22. The assembly of claim 20, wherein said housing further comprises an intermediate member adjacent one end of said tubular section and disposed between said levers, said intermediate member having axial projections and the lever of said second clutch having alternating prongs and slots, said projections extending through said slots and further comprising a substantially flange-like member connected with said projections the lever of said second clutch being disposed between said flange-like member and said intermediate member.

23. The assembly of claim 22, further comprising a casing, said flange-like member having a protuberance in said casing.

24. The assembly of claim 23, wherein said protuberance includes an axial stub and said casing has an axial bore for said stub, said casing including a transmission case and said stub extending from said flange-like member in a direction away from said housing.

25. The assembly of claim 16, wherein said housing further comprises an intermediate member adjacent one end of said tubular section at said one side of said partition, said intermediate member being disposed between said levers.

26. The assembly of claim 25, wherein the driving and driven means of said second clutch are disposed at the other side of said partition, the lever of the operating means of said first clutch being located between said intermediate member and the lever of the operating means of said second clutch.

27. The assembly of claim 25, wherein each of said units includes a piston and the piston of said second clutch surrounds the piston of said first clutch.

28. The assembly of claim 1, wherein each of said units includes a piston and the piston of said one unit is surrounded by the piston of said other unit, the piston of said one unit having an extension projecting axially through and beyond the piston of said other unit.

29. The assembly of claim 28, further comprising a housing for said clutches, said housing defining an internal space and said extension projecting into said space.

30. The assembly of claim 29, further comprising means for transmitting motion between said extension and the lever of the respective clutch, said motion transmitting means comprising an actuator in said internal space.

31. The assembly of claim 30, wherein said housing comprises a tubular section having a first end and a second end, a washer-like partition extending substantially radially inwardly from said tubular section intermediate said ends, and an intermediate member adjacent one end of said tubular section, the driving and driven means and the lever of one of said clutches being disposed between said partition and said intermediate member and said actuator engaging the lever of said one clutch.

32. The assembly of claim 1, further comprising a housing for said clutches, each of said units including a hydraulic cylinder and piston unit and further comprising a source of pressurized hydraulic fluid for said units and means for conveying fluid between said source and said units, said conveying means including passages provided in said housing.

33. The assembly of claim 32, further comprising means for cooling said clutches including a source of coolant and means for conveying coolant from said source of coolant to said clutches.

34. The assembly of claim 33, further comprising a carrier connected with said housing and with said sources, said fluid conveying means including a channel provided in said carrier and arranged to supply fluid to at least one of said units, said units including a common cylinder and each of said units further including a piston which is reciprocable relative to said cylinder, said fluid conveying means further comprising at least one channel provided in said cylinder.

35. The assembly of claim 34, wherein the piston of said at least one unit is movable axially relative to said cylinder and defines therewith a working chamber arranged to receive fluid by way of the channel in said cylinder.

36. The assembly of claim 32, wherein said fluid conveying means is common to said units.

37. The assembly of claim 32, wherein said fluid conveying means includes means for supplying to said units pressurized fluid at the same pressure.

38. The assembly of claim 32, wherein said units define working chambers and said fluid conveying means includes means for communicatively connecting said working chambers with each other.

39. The assembly of claim 1, wherein said units include hydraulic cylinder and piston units each having a piston, and further comprising a source of pressurized hydraulic fluid, means for conveying fluid from said source to said units to thereby move said pistons in predetermined directions, and means for opposing movements of at least one of said pistons in the respective predetermined direction.

40. The assembly of claim 39, wherein the diaphragm spring of the lever which is movable by said at least one piston is prestressed to urge the respective lever to said first position and the unit including said at least one piston is operable by pressurized fluid to move the respective lever to said second position.

41. The assembly of claim 40, wherein said opposing means includes a compartment and said units include working chambers arranged to receive pressurized fluid from said conveying means, said opposing means further comprising means for admitting into said compartment a pressurized medium which opposes the movement of said at least one piston in response to admission of pressurized fluid into the respective working chamber.

42. The assembly of claim 41, wherein said compartment is provided in one of said units.

43. The assembly of claim 42, wherein the piston of the unit embodying said compartment is disposed between said compartment and the respective working chamber.

44. The assembly of claim 42, wherein said units comprise a common cylinder and discrete pistons one of which is reciprocable within said cylinder, said compartment being defined by said cylinder and the piston within said cylinder.

45. The assembly of claim 41, further comprising means for maintaining the pressure of medium in said compartment at up to 60% of fluid pressure in the respective working chamber.

46. The assembly of claim 45, wherein the pressure of medium in said compartment is between 5 and 40% of pressure of fluid in the respective working chamber.

47. The assembly of claim 1, further comprising means for cooling said clutches including a source of coolant and means for conveying coolant from said source to said clutches, said conveying means including substantially axially extending conduits and carrier means for said conduits.

48. The assembly of claim 47, wherein the coolant is oil.

49. The assembly of claim 47, wherein said conduits include at least one first conduit for delivery of coolant to one of said clutches and at least one longer second conduit for delivery of coolant to the other of said clutches.

50. The assembly of claim 47, wherein said conduits are disposed radially outwardly of said units and further comprising a housing for said clutches including a tubular section surrounding said driving and driven means and an intermediate member at one end of said tubular section, said intermediate member being disposed between said diaphragm springs and including projections extending in a direction away from said tubular section radially outwardly of said conduits, one of said diaphragm springs having alternating prongs and slots and said projections extending through said slots.

51. The assembly of claim 47, wherein said diaphragm springs have slots and said conduits extend through the slots of said diaphragm springs.

52. The assembly of claim 1, further comprising means for cooling said clutches including a source of coolant, means for conveying coolant from said source to said clutches, and means for regulating the flow of coolant to at least one of said clutches.

53. The assembly of claim 52, wherein said units include cylinder means and pistons reciprocable relative to said cylinder means, the piston of said at least one clutch being disposed within said cylinder means and the operating means of said at least one clutch further comprising means for transmitting motion between the piston within said cylinder means and the respective lever, said regulating means including a valve provided on said motion transmitting means and arranged to at least reduce the rate of coolant flow to said at least one clutch in response to movement of said motion transmitting means in a predetermined direction.

54. The assembly of claim 53, wherein said valve includes a plate-like member and includes means for distributing the coolant.

55. The assembly of claim 54, wherein said valve includes means for at least partially sealing said conveying means in the second position of the lever of said at least one clutch.

56. The assembly of claim 1, further comprising means for cooling said clutches including a source of coolant, a rotary carrier, and means for conveying coolant from said source to said clutches including conduits mounted on said carrier and annular channel means provided in said carrier and arranged to supply coolant from said source to said conduits.

57. The assembly of claim 56, further comprising a housing defining an internal space for said clutches, said carrier being adjacent said housing and said channel means having an open inner side, said source including a casing having at least one outlet for admission of coolant into said channel means.

58. The assembly of claim 1, further comprising means for cooling said clutches including a pump constituting or forming part of a source of coolant, means for conveying coolant from said pump to said clutches including conduits and rotary carrier means for said conduits, said carrier means including means for driving said pump.

59. The assembly of claim 58, wherein the coolant is a liquid and further comprising means for conveying liquid from said pump to said units.

60. The assembly of claim 1, further comprising combined cooling means for said clutches and fluid supplying means for said units, including a source having first outlet means for coolant and second outlet means for fluid.

61. The combination of the assembly of claim 1 with a combustion engine including means for rotating said driving means, said rotating means including torsional vibration damping means having at least one torque limiting slip clutch and elastic damper means in series with said slip clutch.

62. The assembly of claim 1, wherein the driving and driven means of each of said clutches include clutch discs and holders for the discs of said driven means, one of said holders extending into the other of said holders.

63. The assembly of claim 62, wherein said holders include means for transmitting torque to discrete input elements of a transmission and further comprising a rotary carrier arranged to transmit torque to said driving means, said holders being cupped axially in a direction away from said carrier, the driving and driven means of said first clutch being disposed between the driving and driven means of said second clutch and said levers, the holder of said first clutch extending into the holder of said second clutch and having at least one opening adjacent the discs of said second clutch, and further comprising means for cooling said second clutch including a source of coolant and means for conveying coolant from said source to said second clutch by way of said opening.

64. The assembly of claim 63 herein the holder of said second clutch has a plurality of openings of different sizes arranged to effect at least substantially uniform distributor of coolant in said second clutch.

65. The assembly of claim 63, wherein the holder of at least one of said clutches includes means for distributing the supplied coolant, said distributing means being disposed radially inwardly of the discs of said second clutch.

66. The assembly of claim 65, wherein said distributing means comprises at least one pan.

67. The assembly of claim 1, wherein each of said driven means comprises clutch discs and a holder for the respective discs, at least one of said holders having means for limiting axial movements of the respective discs.

68. The assembly of claim 67, wherein said limiting means comprises a ring.

69. The assembly of claim 1, further comprising a housing having a partition between the driving and driven means of said clutches, each of said driving and driven means including clutch discs and each of said clutches further comprising a holder for the discs of the respective driven means, said housing further comprising a flange and the driving and driven means of said first clutch being disposed between said partition and said flange, the holder of said first clutch being movable axially between said flange and the holder of said second clutch.

70. The assembly of claim 1, wherein said first clutch is a starter clutch.

71. The assembly of claim 1, wherein the driving and driven means of each of said clutches include clutch discs, the number of discs in one of said clutches exceeding the number of discs in the other of said clutches.

* * * * *